United States Patent
Kochura et al.

(10) Patent No.: US 11,186,994 B2
(45) Date of Patent: Nov. 30, 2021

(54) ICE DAM PREVENTION SYSTEM

(71) Applicant: International Business Machines Corporation, Armonk, NY (US)

(72) Inventors: Nadiya Kochura, Boston, MA (US); Rasit Onur Topaloglu, Poughkeepsie, NY (US); Joan Mccarthy-Griffin, Amherst, NH (US); Aline Wilkins, Tyngsboro, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 16/456,042

(22) Filed: Jun. 28, 2019

(65) Prior Publication Data

US 2020/0407976 A1    Dec. 31, 2020

(51) Int. Cl.
*G05D 23/00* (2006.01)
*E04D 13/10* (2006.01)
*G05B 13/04* (2006.01)

(52) U.S. Cl.
CPC ......... *E04D 13/103* (2013.01); *G05B 13/048* (2013.01)

(58) Field of Classification Search
CPC .... E04D 13/103; G05B 13/048; B64D 15/22; E01D 11/04; E01D 19/16; F25B 2700/11; F25D 21/006; F25D 21/02; F25D 21/08; G05D 23/19; G05D 23/1932; H02G 7/16
See application file for complete search history.

(56) References Cited

U.S. PATENT DOCUMENTS

| | | | |
|---|---|---|---|
| 5,763,858 A | 6/1998 | Jones | |
| 6,700,098 B1 | 3/2004 | Wyatt et al. | |
| 8,901,458 B2 | 12/2014 | Aussi et al. | |
| 9,290,273 B1 * | 3/2016 | Thompson | G05D 23/19 |
| 2016/0060871 A1 | 3/2016 | Kulkarni et al. | |
| 2019/0017274 A1 | 1/2019 | Song | |
| 2019/0360739 A1 * | 11/2019 | Brown | H02G 7/16 |
| 2020/0062409 A1 * | 2/2020 | Kim | G06F 17/11 |
| 2020/0286350 A1 * | 9/2020 | Heintzelman | G08B 19/00 |

OTHER PUBLICATIONS

"How Do I Operate My Heat Cable System?," Wisconsin Ice Dam Solutions, Jan. 29, 2013, 3 pages http://www.wi-icedamsolutions.com/how-do-i-operate-my-heat-cable-system.aspx.
"Roof & Gutter De-Icing Kit; Model ADKS Owner's Manual," Emerson Industrial Automation, Printed Jun. 26, 2019, 36 pages.
Mell et al., "The NIST Definition of Cloud Computing," Recommendations of the National Institute of Standards and Technology, U.S. Department of Commerce, Special Publication 800-145, Sep. 2011, 7 pages.

* cited by examiner

*Primary Examiner* — Zhipeng Wang
(74) *Attorney, Agent, or Firm* — Jamar K. Ray

(57) ABSTRACT

A method may include obtaining first ambient condition data corresponding to a first building in a first location. The method may further include obtaining a set of ice dam models. The method may further include predicting, based at least in part on the set of ice dam models, an ice dam formation on the first building. The method may further include obtaining a heating profile. The heating profile may be based at least in part on the first ambient condition data. The method may further include adjusting, based on the heating profile, a heating device of the first building.

20 Claims, 6 Drawing Sheets

ICE DAM PREVENTION SYSTEM

BACKGROUND

The present disclosure relates to preventing ice dam formation on buildings, and more specifically, to controlling a heating system to prevent ice dam formation on buildings.

Ice dams may form when snow melts due to heat loss through a roof and the melted snow re-freezes proximate the edge of the roof. Deep snow and low temperatures may increase the size and the likelihood of ice dam formation. Ice dams may cause water to leak through a roof; they may also cause damage to structures such as gutters.

SUMMARY

Some embodiments of the present disclosure can be illustrated as a method. The method may include obtaining first ambient condition data corresponding to a first building in a first location. The method may further include obtaining a set of ice dam models. The method may further include predicting, based at least in part on the set of ice dam models, an ice dam formation on the first building. The method may further include obtaining a heating profile. The heating profile may be based at least in part on the first ambient condition data. The method may further include adjusting, based on the heating profile, a heating device of the first building.

A system and a computer program product corresponding to the above computer-implemented method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
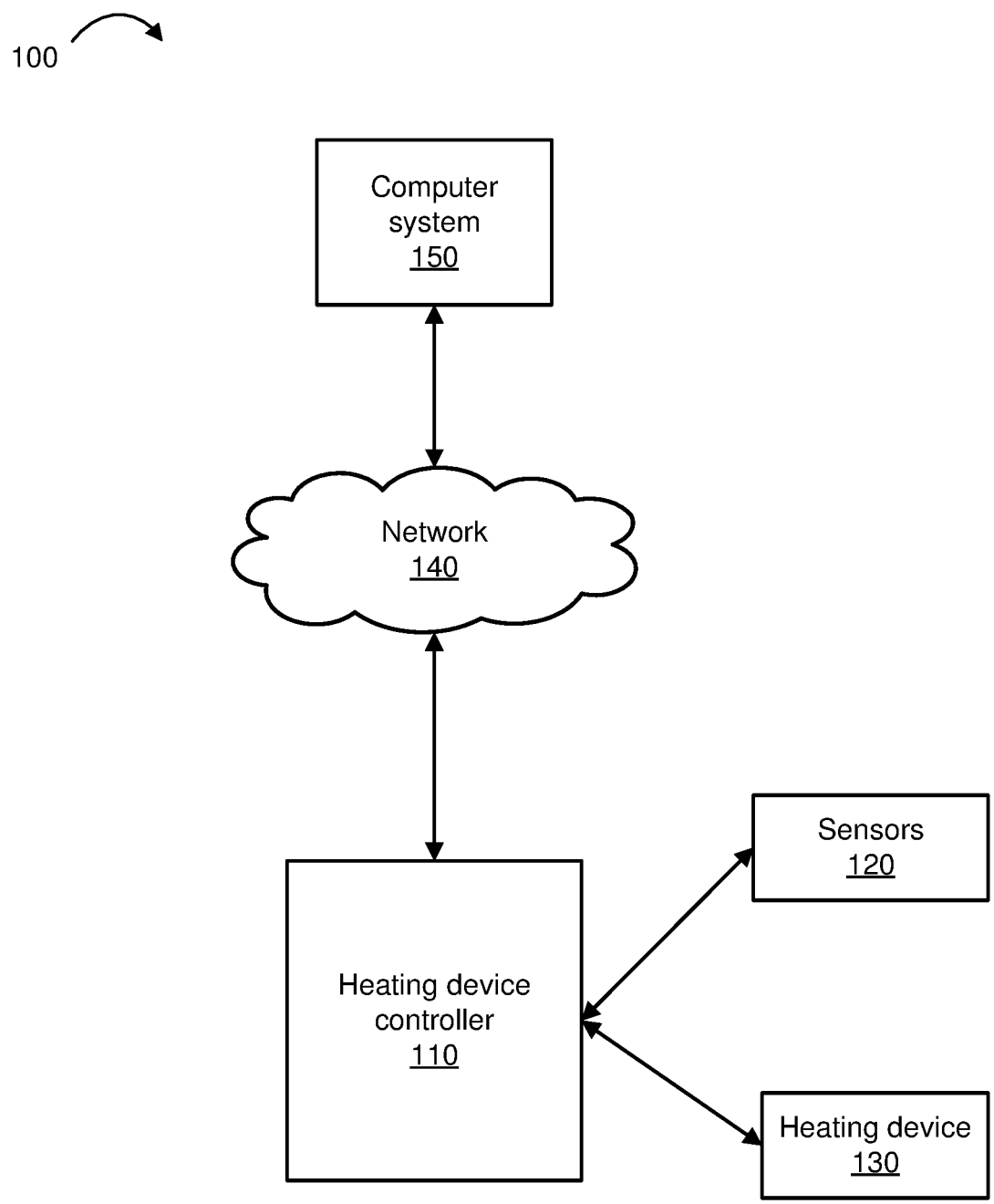
FIG. 1 depicts an example ice dam prevention system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to preventing ice dam formation; more particular aspects relate to controlling a heating device to prevent ice dam formation. While the present disclosure is not necessarily limited to such applications, various aspects of the disclosure may be appreciated through a discussion of various examples using this context.

Ice dams may be difficult to identify and eliminate before they damage a building. Additionally, heating devices used to prevent ice dam formation may be ineffective and/or lack energy efficiency during their operation.

To address these and other problems, embodiments of the present disclosure include a system and method for adjusting a heating device to prevent ice dam formation according to a heating profile that may account for a variety of ambient conditions and building characteristics. By accounting for a building's particular ambient conditions and building characteristics, embodiments of the present disclosure may accurately detect and predict an accumulation of ice on a roof. Additionally, by accounting for a building's particular ambient conditions and building characteristics, embodiments of the present disclosure may provide an energy-efficient heating profile that may be effective for preventing ice dam formation on a roof.

In some embodiments of the present disclosure, an ice dam prevention system may generate an ice dam prediction (i.e., a prediction whether ice dam formation may occur) based on obtained ambient condition data, building characteristic data, and a set of ice dam models. In some embodiments of the present disclosure, an ice dam prevention system may generate and utilize a heating profile based on one or more of obtained ambient condition data, building characteristic data, a set of ice dam models, and an ice dam prediction. In some embodiments of the present disclosure, two or more discrete heating device controllers may transmit data such as a set of ice dam models, an ice dam prediction, and/or heating profiles, to one another and to facilitate the development of machine learning correlations that may be used to prevent ice dam formation. In some embodiments of the present disclosure, the heating device controller may control the heating device autonomously.

A "set" as used in the present disclosure may refer to one or more of the items presented (e.g., a set of sensors may refer to one or more sensors). A "building" may refer to a structure having a roof, such as a house or a commercial structure, such as a hotel, shopping mall, or office space.

Turning to the figures, FIG. 1 illustrates an example ice dam prevention system 100 according to an embodiment of the present disclosure. Ice dam prevention system 100 may include a heating device controller 110 that may be in communication with a set of sensors 120 and a heating device 130. In some embodiments, the heating device controller 110 may communicate with the set of sensors 120 and the heating device 130 via at least one of a wired or a wireless communication path (e.g., a BLUETOOTH communication path; or a home or office local area network). The heating device controller 110 may include a computer system, such as the computer system 401 described with respect to FIG. 4. The heating device controller 110 may include a processor configured to perform one or more process steps for autonomously adjusting the heating device 130, such as the process steps disclosed in FIG. 2.

The ice dam prevention system 100 may include a set of sensors 120. As discussed below, the set of sensors 120 may include a variety of sensor types, such as optical sensors (e.g., cameras), weight sensors, and temperature sensors. In some embodiments, the set of sensors 120 may be mounted to one or more exterior (e.g., outdoor) surfaces of a building, such as a roof of a building, and may be configured to continuously or periodically obtain or monitor parameter value measurements and transmit such measurements to the heating device controller 110.

The ice dam prevention system 100 may include a heating device 130. The heating device 130 may be a device that is configured to apply heat to one or more exterior surfaces of a building, such as a roof of a building. In some embodiments, the heating device 130 may include a network of heating elements or heating cables mounted to the roof of a building. In some embodiments, a temperature of such heating cables may be adjusted by varying an electric current that passes through the heating cables. In some embodiments, the heating device 130 may apply heat to one or more exterior surfaces of a building according to a heating profile implemented by the heating device controller 110. Such a heating profile may include the heating device controller 110 varying in amount of heat applied by the heating device 130 with respect to time. For example, in some embodiments, the heating device controller 130 may increase or decrease an electric current supplied to the heating device 130, resulting in a corresponding increase or decrease in an amount of heat applied by the heating device 130 to an exterior surface of a building. In some embodiments, the heating device controller 130 may implement such heating variations over predetermined periods of time based on data the heating device controller 130 obtains from sources such as sensors 120 and computer systems 150.

Computer systems 150 may include one or more electronic devices such as a cloud server, an additional heating device controller, or smart phone. In some embodiments, computer systems 150 may electronically communicate with the heating device controller 110 via the network 140. In some embodiments, the network 140 may be a wide area network (WAN), a local area network (LAN), the Internet, or an intranet. In some embodiments, the network 140 may be substantially similar to, or the same as, network 50 described in FIG. 5.

Figure 2:
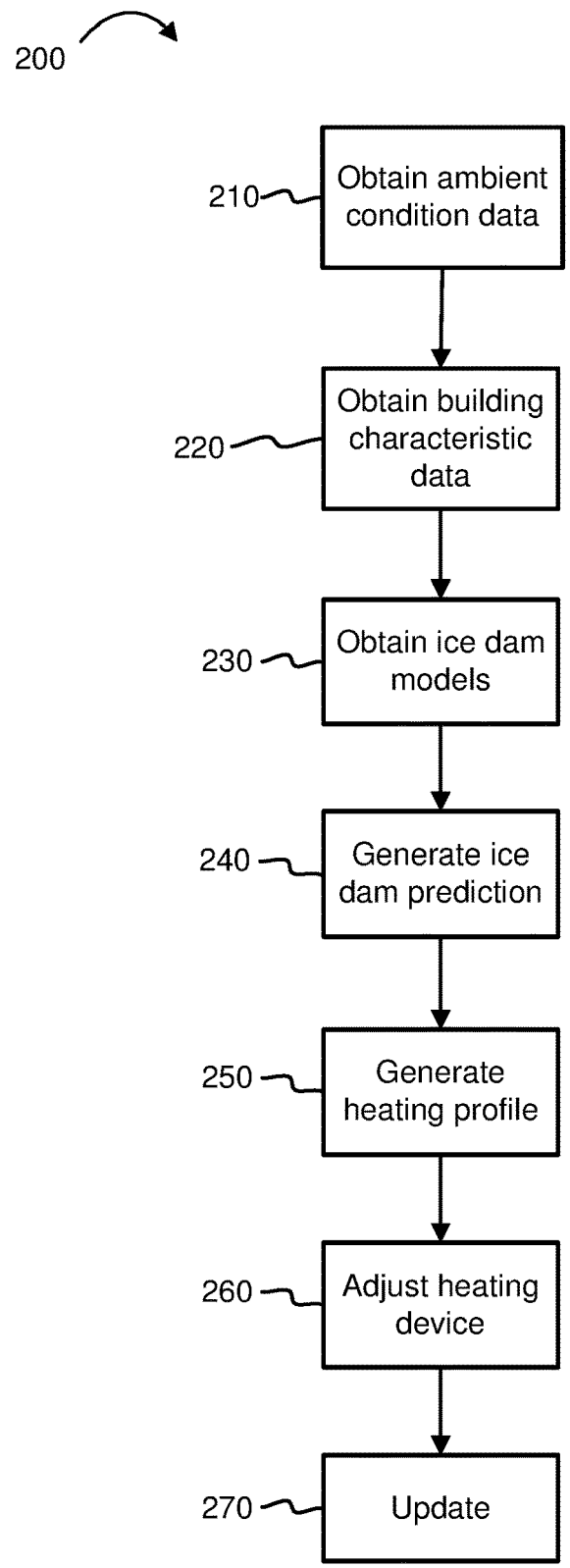
FIG. 2 depicts a flowchart of an example method for adjusting a heating device to prevent ice dam formation, in accordance with embodiments of the present disclosure.

FIG. 2 illustrates a flowchart of an example method 200 for adjusting a heating device to prevent ice dam formation (e.g., an accumulation of ice that has become or may become an ice dam), in accordance with embodiments of the present disclosure. The method 200 may be performed by a heating device controller, such as the heating device controller 110 described with respect to FIG. 1.

Referring back to FIG. 2, in step 210, a heating device controller may obtain ambient condition data regarding outdoor conditions where a building is located. The ambient condition data may include a set of parameter values such as a temperature, humidity, precipitation rate, wind speed, wind direction, and/or a weather forecast, that describe a set of environmental conditions at a first time. In some embodiments, the ambient condition data may be obtained by at least one of a set of sensors and a computer system, and the data may be transmitted to the heating device controller (e.g., a set of sensors mounted to or positioned proximate the building may measure wind speed, wind direction, temperature, and humidity, and transmit the measurements to the heating device controller. In some embodiments, a remote server may obtain a weather forecast corresponding to the building location and transmit the weather forecast to the heating device controller). Accordingly, in step 210, the heating device controller may obtain a set of parameter values corresponding to a set of ambient conditions at a first time.

In step 220, the heating device controller may obtain building characteristic data at a first time. In some embodiments, the building characteristic data may include at least one of a geographic location, roof geometry (e.g., roof size and roof slope), roof type, roof temperature, roof weight measurements, and images of the building. In some embodiments, the building characteristic data may be used by the heating device controller to determine whether ice and/or snow has accumulated on the roof. In some embodiments, the building characteristic data may be obtained by at least one of a set of sensors and a computer system of the ice dam prevention system, and the data may be transmitted to the heating device controller. For example, in some embodiments, a set of weight sensors may measure a weight of snow that has accumulated on the roof of a building and transmit the measurement to the heating device controller. In some embodiments, a computer system of the heating device controller may obtain, from an online database, specifications corresponding to the roofing material of the building, such as a thermal conductivity and a reflectance of the roofing materials. Accordingly, in step 220, the heating device controller may obtain a set of building characteristics that are a specific to the building.

In step 230, the heating device controller may obtain a set of ice dam models. In some embodiments, an ice dam model may include a set of parameter values under which ice dam formation has occurred or is determined likely to occur. In some embodiments, the set of parameter values of an ice dam model may include ambient condition data and/or building characteristic data that has been measured and stored by an ice dam prevention system, and under which parameter values the ice dam prevention system detected ice dam formation. In some embodiments, an ice dam model may include a set of parameter values that, based on a set of mathematical calculations, correspond to potential ice dam formation.

For example, sensing devices of an ice dam prevention system may measure and store a set of parameter values that corresponds with an ice dam formation (e.g., an accumulation of ice) on a roof of a building. For example, in some embodiments, a set of roof weight sensors and roof temperature sensors included in the ice dam prevention system may measure a weight and a temperature that indicate that an ice dam has formed on the roof. The ice dam prevention system may store the measured parameter values as an ice dam model and/or transmit them via a network to a computer system, such as a remote server.

In some embodiments, an ice dam prevention system may obtain a set of predetermined ice dam models that correspond to potential ice dam formations. In some embodiments, the potential ice dam formations may be determined by mathematical calculations. In some embodiments, the set of predetermined ice dam models may include one or more parameter values that indicate a potential ice dam formation. For example, in some embodiments, the set of parameter values may include a temperature, precipitation rate, thermal conductivity and reflectance of roofing materials, and a size and slope of a roof. In some embodiments, mathematical calculations based on the set of parameter values may approximate an accumulation over time of a mass of ice within a distance of a roof edge. The calculated size of the mass of ice and the calculated distance between the mass of ice and the roof edge may exceed thresholds that indicate a high likelihood of ice dam formation.

In some embodiments, such predetermined ice dam models may be included within the internal storage of an ice dam prevention system and may serve as initial values for detecting ice dams. In some embodiments, the accuracy of the ice dam models may be refined through machine learning processes (e.g., correlations between a set of ice dam model parameter values and whether an ice dam is present may be refined by subsequent measurements by sensors of the ice dam prevention system).

In some embodiments, step 230 may include at least one of retrieving a set of ice dam models from a storage location (e.g., a data storage location within the heating device controller) and receiving a set of ice dam models from a computer system (e.g., from a cloud server or from a discrete heating device controller used with a different building in different location).

For example, in some embodiments, a first heating device controller may be used with a first building in a first location, and a discrete, second heating device controller may be used with a discrete, second building in a second location. The first building and the second building may share one or more building characteristics (e.g., the rooves of both buildings may have identical or substantially similar geometries, or the roofing materials of both buildings may have identical or substantially similar thermal conductivities, such as thermal conductivities between approximately 0.1% and 5% of one another). In such embodiments, the first heating device controller and the second heating device controller may transmit ice dam models to one another via a network. This sharing of ice dam models between the first heating device controller and the second heating device controller may accelerate each device's ability to identify ice dams through machine learning processes. For example, in some embodiments, the first building may experience multiple days of freezing conditions and precipitation during a time when the second building does not. In this example, the second heating device controller may obtain a set of ice dam models based on sensor measurements taken at the first building. Thus, the second heating device controller may obtain relevant parameter values for its operation regardless of the weather conditions in the second location. Additionally, since the first building may have substantially similar building characteristics to those of the second, the ice dam models obtained from the first heating device controller may be especially effective for generating an ice dam prediction at the second building.

In step 240, the heating device controller may generate an ice dam prediction. In some embodiments, generating an ice dam prediction may include predicting whether ice dam formation may occur based on at least one of ambient condition data, building characteristic data, and a set of ice dam models. In some embodiments, step 240 may include the heating device controller predicting a size and a location of one or more accumulations of ice masses on the roof of a building. In some embodiments, generating an ice dam prediction may include comparing at least one of the ambient condition data and the building characteristic data to a set of ice dam models and determining whether parameter values meet threshold criteria.

For example, in some embodiments, ambient condition data may indicate an ambient temperature of 35° F., a snowfall rate of 0.25 in./h, and a northerly wind speed of 19 mph. Additionally, in this example, building characteristic data may indicate that a building has a 2:12 roof slope, an average roof temperature of 27° F. proximate the roof edges, and an average roof thermal conductivity of 0.5 Btu/hr-ft-° F. Additionally, in this example, ice dam models may indicate that ice dams have formed on the building's roof when the ambient temperature was between 30° F. and 40° F., the snowfall rate was 0.15 in./h, and a northerly wind speed was 15 mph. Additionally, in this example, building characteristic data may indicate that ice dams have formed on the building's roof when the average roof temperature proximate the roof edges was 30° F. In this example, the heating device controller may predict that an ice dam may form based on one or more ranges and one or more thresholds established by the ice dam models. For example, the heating device controller may predict that an ice dam may form based on the ambient temperature (35° F.) falling within an ice dam model range (30° F.-40° F.); the current snowfall rate and wind speed being higher than the ice dam model snowfall rate and wind speed; and the average roof temperature proximate the roof edges being lower than that of the ice dam models. In some embodiments, the heating device controller may have obtained the ice dam models from a different building having the same roof slope and a similar average roof thermal conductivity.

In step 250, the heating device controller may obtain a heating profile. In some embodiments, a heating profile may include a set of instructions to vary an amount of heat output by a heating device over a predetermined period of time (e.g., varying an amount of power supplied to a heating device over a four-hour time period). In some embodiments, a heating profile may include discrete sets of heating instructions for discrete portions of a roof (e.g., the heating profile may include instructions to activate a heating device positioned on a first portion of a roof at a first time and to activate a second heating device positioned on a second portion of the roof at a second, later time). In some embodiments, step 250 may include the heating device controller generating a heating profile based on at least one of the ambient condition data, the building characteristic data, the ice dam models, and the ice dam prediction. For example, in some embodiments, the heating device controller may generate a heating profile that includes activating a heating device for maximum heat output based on a prediction that a large ice dam is likely to form. In some embodiments, step 250 may include at least one of retrieving a previously stored heating profile from a storage location (e.g., a data storage location within the heating device controller) and receiving a heating profile from a computer system, such as another heating device controller or a remote server.

For example, in some embodiments, the heating device controller may determine a time period for activating the heating device based at least in part on a weather forecast. For example, in some embodiments a weather forecast obtained by the heating device controller may include a weather advisory that includes freezing conditions and precipitation to begin in three hours and to continue for six hours. In this example, the heating device controller may determine an eight-hour time period for activating the heating device. In this example, the heating device controller may determine to activate the heating device one hour before the weather advisory is to begin (to warm the roof in advance of the freezing conditions) and the heating device controller may determine to deactivate the heating device one hour after the weather advisory is to end (to prevent potential ice buildup during that time). Additionally, in this example, the heating device controller may determine a heat output by the heating device over the eight-hour time period. For example, in some embodiments, the heating device controller may determine to gradually increase, over the first hour, an amount of power supplied to the heating device from a minimum value to a maximum value; maintain a constant, maximum amount of power supplied to the heating device during the six-hour time period of the weather advisory; and gradually decrease, over the eighth hour, the amount of power supplied to the heating device from a maximum value to a minimum value. By determining such a time period and heat output, the heating device controller may heat a roof with energy efficiency by providing heat while limiting the time period that a maximum amount of heat is output by the heating device.

In some embodiments, step 250 may include a first heating device controller for a first building under a first set of ambient conditions obtaining a heating profile that was generated by a discrete, second heating device controller for a discrete, second building under a second set of substantially similar ambient conditions (e.g., the second set of ambient conditions includes values within approximately 1% to 5% of the values in the first set of ambient conditions). In this example, the first building and the second building may have substantially similar building characteristics (e.g., the first building may have a same roof slope as the second building and an average roof thermal conductivity that is within approximately 0.1% to 5% of the average roof thermal conductivity of the second building). In this example, the heating profile that was generated by the second heating device may have been effective for preventing ice dam formation on the second building under the second set of ambient conditions. By obtaining such a heating profile, the first heating device controller may utilize a heating profile that was proven effective for a building under substantially similar ambient conditions and having substantially similar building characteristics. Thus, by sharing data such as ice dam models and heating profiles, embodiments of the present disclosure may, in effect, "collaborate" to develop highly effective heating profiles over time. Also, the sharing of such data may allow a less utilized heating device controller to more quickly develop effective ice dam models and heating profiles by obtaining machine learning correlations that have been developed by more utilized heating device controllers, rather than developing machine learning correlations from scratch.

In step 260, the heating device controller may apply a heating profile to adjust the heating device. In some embodiments, such adjusting may include activating and/or deactivating the heating device over predetermined time periods. In some embodiments, such adjusting may include varying the heat output by the heating device (e.g., varying an amount of power supplied to the heating device) over predetermined time periods. In some embodiments, such adjusting may include applying discrete heating profiles to discrete heating devices for a building.

In step 270, the heating device controller may update one or more of the ambient condition data, building characteristic data, ice dam models, ice dam predictions, and heating profile. For example, in some embodiments, the heating device controller may modify at least one of an ice dam model, an ice dam prediction, and a heating profile based on subsequently acquired ambient condition data and/or building characteristic data. For example, in some embodiments, the heating device controller may determine that an ambient temperature and a precipitation rate measured by sensors of the ice dam prevention system do not match a forecasted ambient temperature and precipitation rate. In these embodiments, the heating device controller may update a heating profile accordingly. In some embodiments, the roof images of the ice dam prevention system may indicate to the heating device controller that ice is accumulating on the roof despite a heating profile being implemented. In such embodiments, the heating device controller may update the heating profile accordingly, such as by increasing an amount of power supplied to the heating device.

In some embodiments, step 270 may include storing information about the effectiveness of the heating profile. For example, in some embodiments, the heating device controller may analyze measurements obtained by the sensors of the ice dam prevention device and determine whether an application of a heating profile prevented ice from accumulating on the roof. In this way, the heating device controller may implement machine learning processes to establish correlations between heating profiles and ice accumulation, and over time, the heating device controller may develop increasingly effective heating profiles for preventing ice dam formation.

Figure 3:
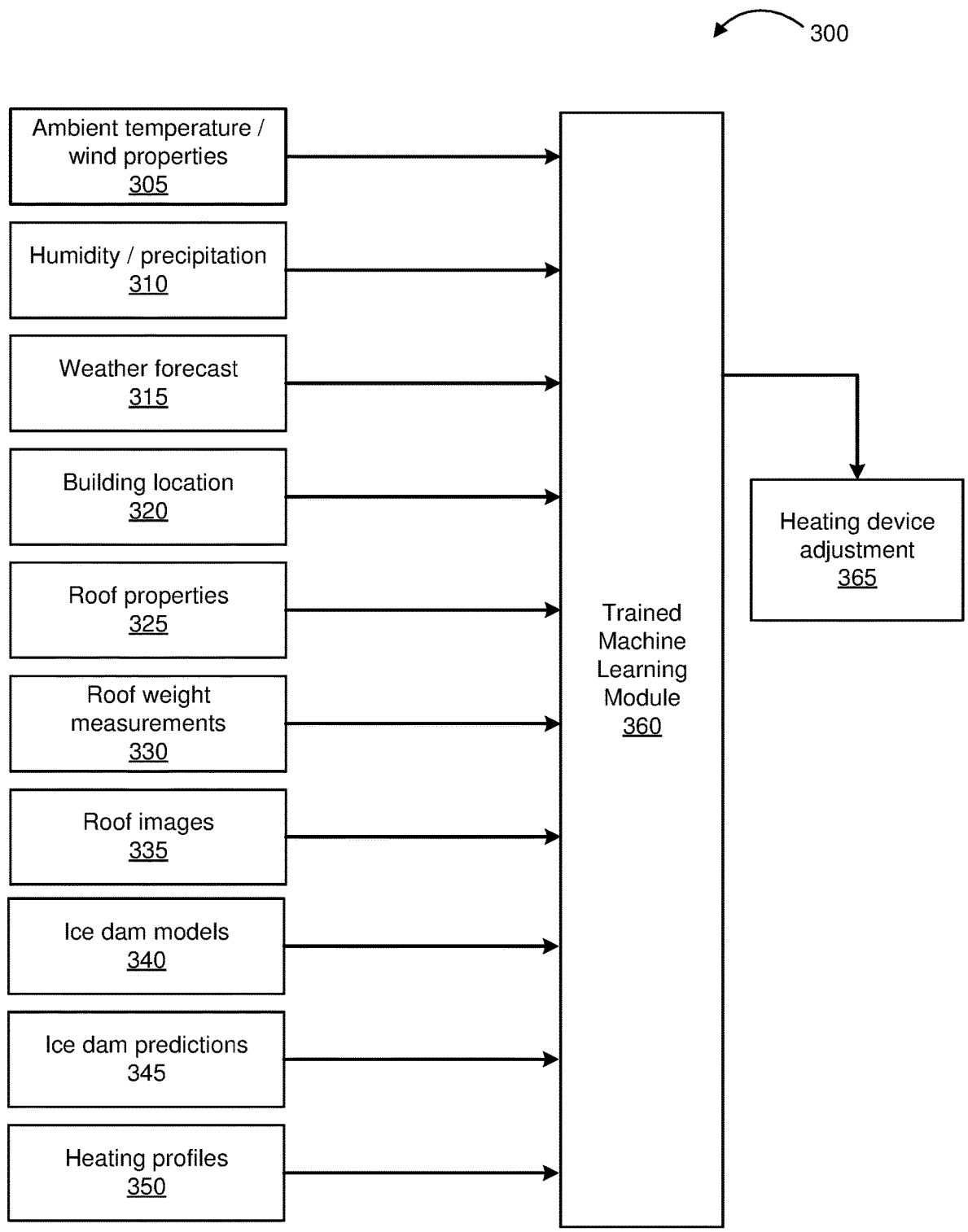
FIG. 3 depicts an example system block diagram of an ice dam prevention system, in accordance with embodiments of the present disclosure.

FIG. 3 illustrates an example system block diagram of an ice dam prevention system 300, in accordance with embodiments of the present disclosure. The trained machine learning module 360 may include one or more processors and/or neural networks. In some embodiments, the trained machine learning module 360 may include a computer system, such as the computer system 401 described with respect to FIG. 4. In some embodiments, the trained machine learning module 360 may be integrated into a heating device controller of the ice dam prevention system. In some embodiments, the trained machine learning module 360 may be external to the heating device controller and may be a component of an external computer system that is in communication with the heating device controller.

The trained machine learning module 360 may obtain one or more of ambient condition data (e.g., ambient temperature and wind properties 305, humidity and precipitation measurements 310, and one or more weather forecasts 315); building characteristic data (e.g., building location 320, roof properties 325, roof weight measurements 330, and roof images 335); ice dam models 340; ice dam predictions 345; and heating profiles 350. In some embodiments, the trained machine learning module 360 may implement machine learning techniques to develop correlations between the obtained data and ice dam formation on a roof. Based on such correlations, the trained machine learning module 360 may generate a heating profile that may be used for heating device adjustment 365.

In some embodiments, ambient temperature and wind properties 305 may be measured, respectively, by a set of temperature sensors and an anemometer in communication with the trained machine learning module 360. In some embodiments, humidity and precipitation data 310 may be measured, respectively, by a humidity sensing device and a precipitation sensor, such as a Doppler radar sensor or a rain gauge, in communication with the trained machine learning module 360. In some embodiments, the trained machine learning module 360 may obtain a weather forecast 315 from a remote computer system, such as a remote server, via a network, such as the Internet.

In some embodiments, the trained machine learning module 360 may obtain a building location 320 from a global positioning system or a remote computer system. In some embodiments, the trained machine learning module 360 may obtain a set of roof properties 325 (e.g., roof size, roof slope, roof temperature, and thermal conductivity and reflectance of roofing materials) from one or more sources. For example, in some embodiments, the slope of a roof may be measured with at least one of an inclinometer, accelerometer, and gyroscope in communication with the trained machine learning module 360. In some embodiments, at least one of a roof size, roof slope, accumulation of ice, and the presence of an ice dam on a roof may be determined from roof images 335 captured by a set of cameras that are in communication with the trained machine learning module 360. In these embodiments, the trained machine learning module 360 may utilize image analysis techniques to identify at least one of ice accumulation, ice dam formation, and one or more roof properties 325. In some embodiments, a set of roof temperature sensors may be positioned in multiple locations on a roof. In such embodiments, the temperature sensors may transmit temperature measurements from discrete portions of the roof, and the trained machine learning module 360 may use the temperature measurements to generate discrete heating profiles for the discrete portions of the roof. In some embodiments, the trained machine learning module may obtain roof weight measurements 330 from a set of weight sensors distributed across the roof. In some embodiments, the weight measurements 330 may indicate a quantity of snow and or ice that has accumulated on the one or more portions of the roof. In these embodiments, the trained machine learning module 360 may use the weight measurements 330 to determine whether an accumulation of ice or an ice dam is present on the roof.

In some embodiments, the trained machine learning module 360 may obtain one or more of the ambient condition data, building characteristic data, ice dam models 340, ice dam predictions 345, and heating profiles 350 from a remote computer system, such as a cloud server or a discrete heating device controller. For example, in some embodiments, the trained machine learning module 360 may obtain information about a thermal conductivity and a reflectance of roofing materials from a database of roofing specifications stored on a homeowner's computer.

Figure 4:
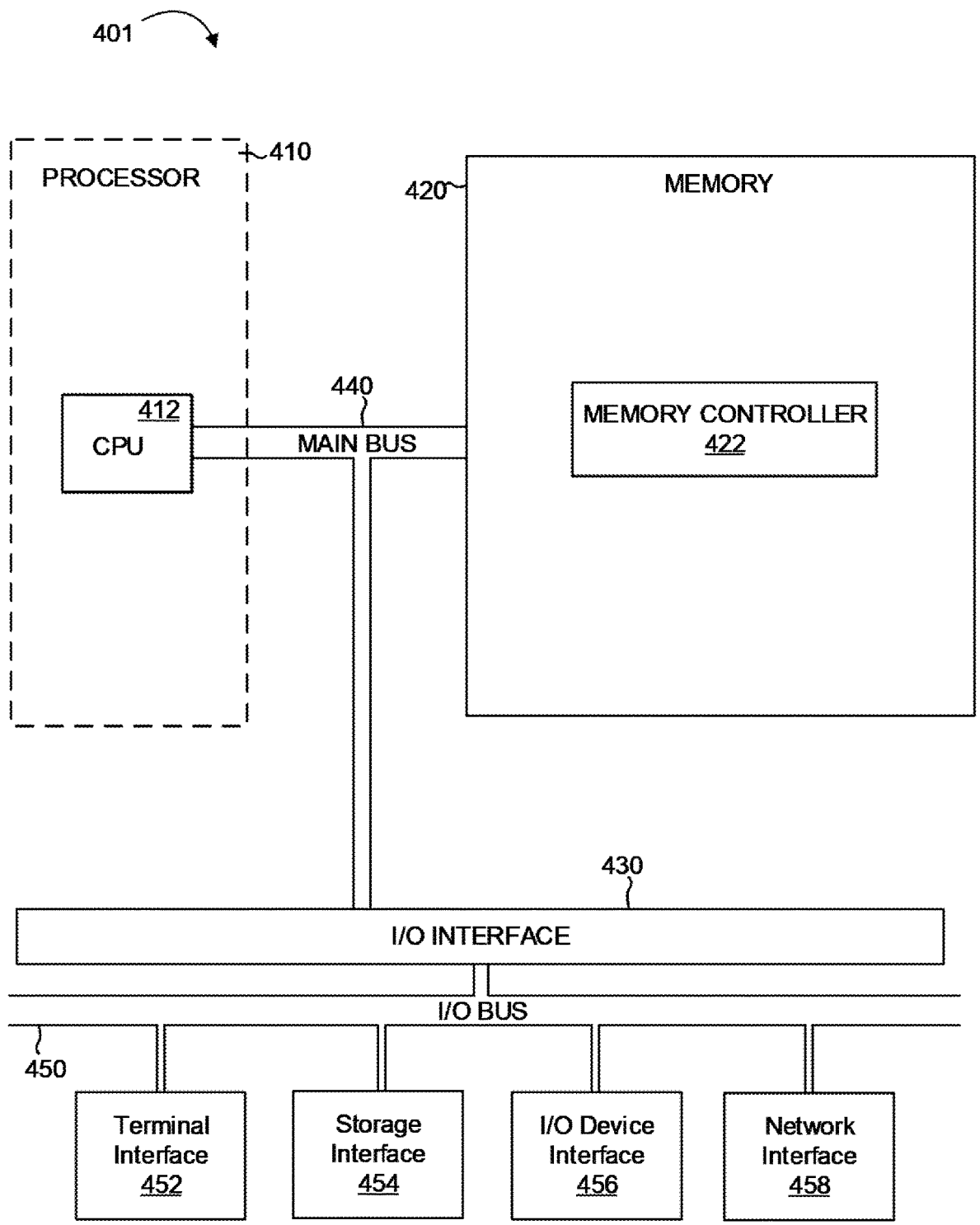
FIG. 4 depicts the representative major components of a computer system that may be used in accordance with embodiments of the present disclosure.

FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
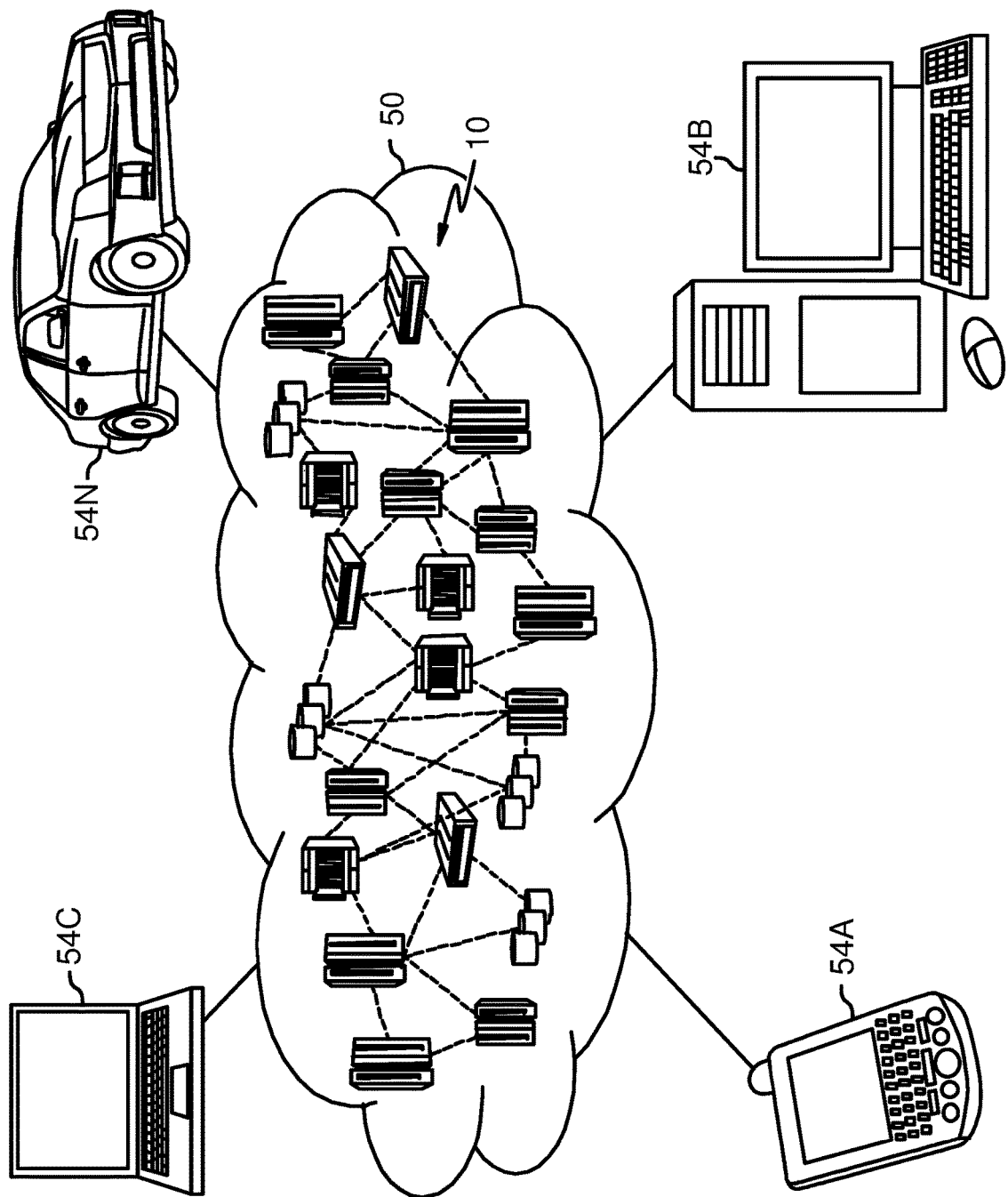
FIG. 5 depicts a cloud computing environment according to embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
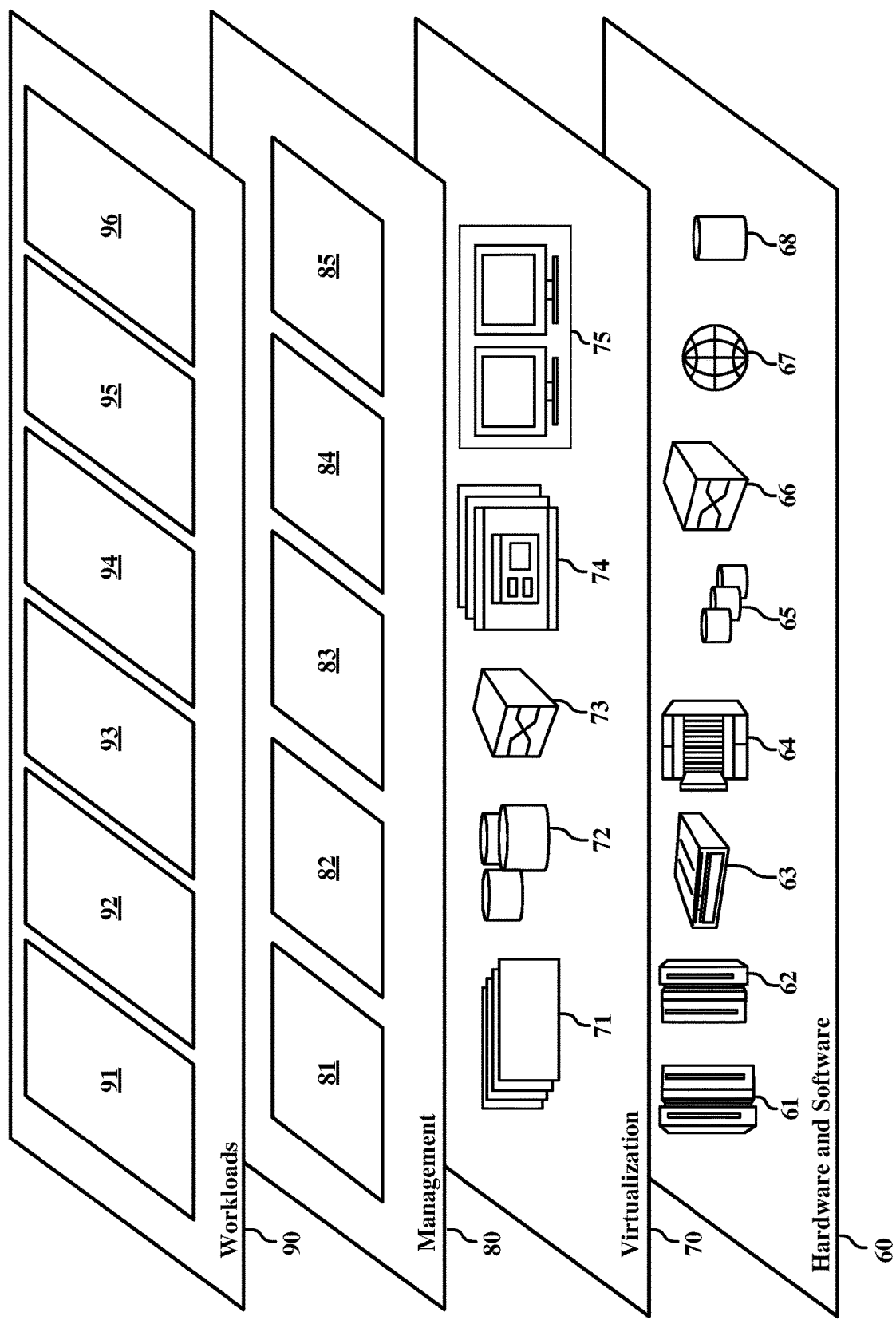
FIG. 6 depicts abstraction model layers according to embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ice dam prevention logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    obtaining first ambient condition data corresponding to a first building;
    obtaining first building characteristic data of the first building, the first building characteristic data comprising roofing material thermal conductivity, roofing material reflectance, and roof slope;
    obtaining a set of ice dam models corresponding to ice dam formation;
    predicting, based on the first ambient condition data, the first building characteristic data, and the set of ice dam models, an ice dam formation on the first building;
    obtaining a heating profile, the heating profile based at least in part on the first ambient condition data; and
    adjusting, based on the heating profile, a heating device of the first building.

2. The method of claim 1, wherein the adjusting the heating device comprises adjusting the heating device using a first heating device controller; and
    wherein the obtaining the set of ice dam models comprises the first heating device controller receiving the set of ice dam models from a discrete, second heating device controller of a discrete, second building.

3. The method of claim 2,
    wherein the second building has second building characteristic data; and
    wherein the first building characteristic data and the second building characteristic data are substantially similar.

4. The method of claim 1, wherein the predicting comprises comparing the first ambient condition data to the set of ice dam models.

5. The method of claim 1, wherein the adjusting the heating device comprises adjusting the heating device using a first heating device controller; and
    wherein the obtaining the heating profile comprises the first heating device controller receiving the heating profile from a discrete, second heating device controller of a discrete, second building.

6. The method of claim 1, wherein the obtaining the heating profile comprises generating the heating profile based at least in part on the first building characteristic data.

7. The method of claim 1, wherein the first building has a roof; and
    wherein the heating profile includes discrete heating instructions for discrete portions of the roof.

8. A system comprising:
    a processor; and
    a memory in communication with the processor, the memory containing program instructions that, when executed by the processor, are configured to cause the processor to perform a method, the method comprising:
        obtaining first ambient condition data corresponding to a first building;
        obtaining first building characteristic data of the first building, the first building characteristic data comprising roofing material thermal conductivity, roofing material reflectance, and roof slope;
        obtaining a set of ice dam models corresponding to ice dam formation;
        predicting, based on the first ambient condition data, the first building characteristic data, and the set of ice dam models, an ice dam formation on the first building;
        obtaining a heating profile, the heating profile based at least in part on the first ambient condition data; and
        adjusting, based on the heating profile, a heating device of the first building.

9. The system of claim 8, wherein the adjusting the heating device comprises adjusting the heating device using a first heating device controller; and
    wherein the obtaining the set of ice dam models comprises the first heating device controller receiving the set of ice dam models from a discrete, second heating device controller of a discrete, second building.

10. The system of claim 9,
    wherein the second building has second building characteristic data; and
    wherein the first building characteristic data and the second building characteristic data are substantially similar.

11. The system of claim 8, wherein the predicting comprises comparing the first ambient condition data to the set of ice dam models.

12. The system of claim 8, wherein the adjusting the heating device comprises adjusting the heating device using a first heating device controller;
    wherein the obtaining the heating profile comprises the first heating device controller receiving the heating profile from a discrete, second heating device controller of a discrete, second building;
    wherein the second building has second building characteristic data; and
    wherein the first building characteristic data and the second building characteristic data are substantially similar.

13. The system of claim 8, wherein the heating profile includes discrete heating instructions for discrete portions of a first roof of the first building.

14. A computer program product, the computer program product comprising a non-transitory computer readable storage medium having program instructions embodied therewith, the program instructions executable by a computer to cause the computer to:
    obtain first ambient condition data corresponding to a first building;
    obtain first building characteristic data of the first building, the first building characteristic data comprising roofing material thermal conductivity, roofing material reflectance, and roof slope;
    obtain a set of ice dam models corresponding to ice dam formation;
    predict, based on the first ambient condition data, the first building characteristic data, and the set of ice dam models, an ice dam formation on the first building;
    obtain a heating profile, the heating profile based at least in part on the first ambient condition data; and
    adjust, based on the heating profile, a heating device of the first building.

15. The computer program product of claim 14, wherein the adjusting the heating device comprises adjusting the heating device using a first heating device controller; and
　　wherein the obtaining the set of ice dam models comprises the first heating device controller receiving the set of ice dam models from a discrete, second heating device controller of a discrete, second building.

16. The computer program product of claim 15,
　　wherein the second building has second building characteristic data; and
　　wherein the first building characteristic data and the second building characteristic data are substantially similar.

17. The computer program product of claim 14, wherein the predicting comprises comparing the first ambient condition data to the set of ice dam models.

18. The computer program product of claim 14, wherein the adjusting the heating device comprises adjusting the heating device using a first heating device controller; and
　　wherein the obtaining the heating profile comprises the first heating device controller receiving the heating profile from a discrete, second heating device controller of a discrete, second building;
　　wherein the second building has second building characteristic data; and
　　wherein the first building characteristic data and the second building characteristic data are substantially similar.

19. The computer program product of claim 14, wherein the obtaining the heating profile comprises generating the heating profile based at least in part on the first building characteristic data.

20. The system of claim 8, wherein the adjusting the heating device comprises adjusting the heating device using a first heating device controller;
　　wherein the method further comprises transmitting, by the first heating device controller, the set of ice dam models to a second heating device controller of a discrete, second building;
　　wherein the second building has second building characteristic data; and
　　wherein the first building characteristic data and the second building characteristic data are substantially similar.

* * * * *